Figures 1, 2:
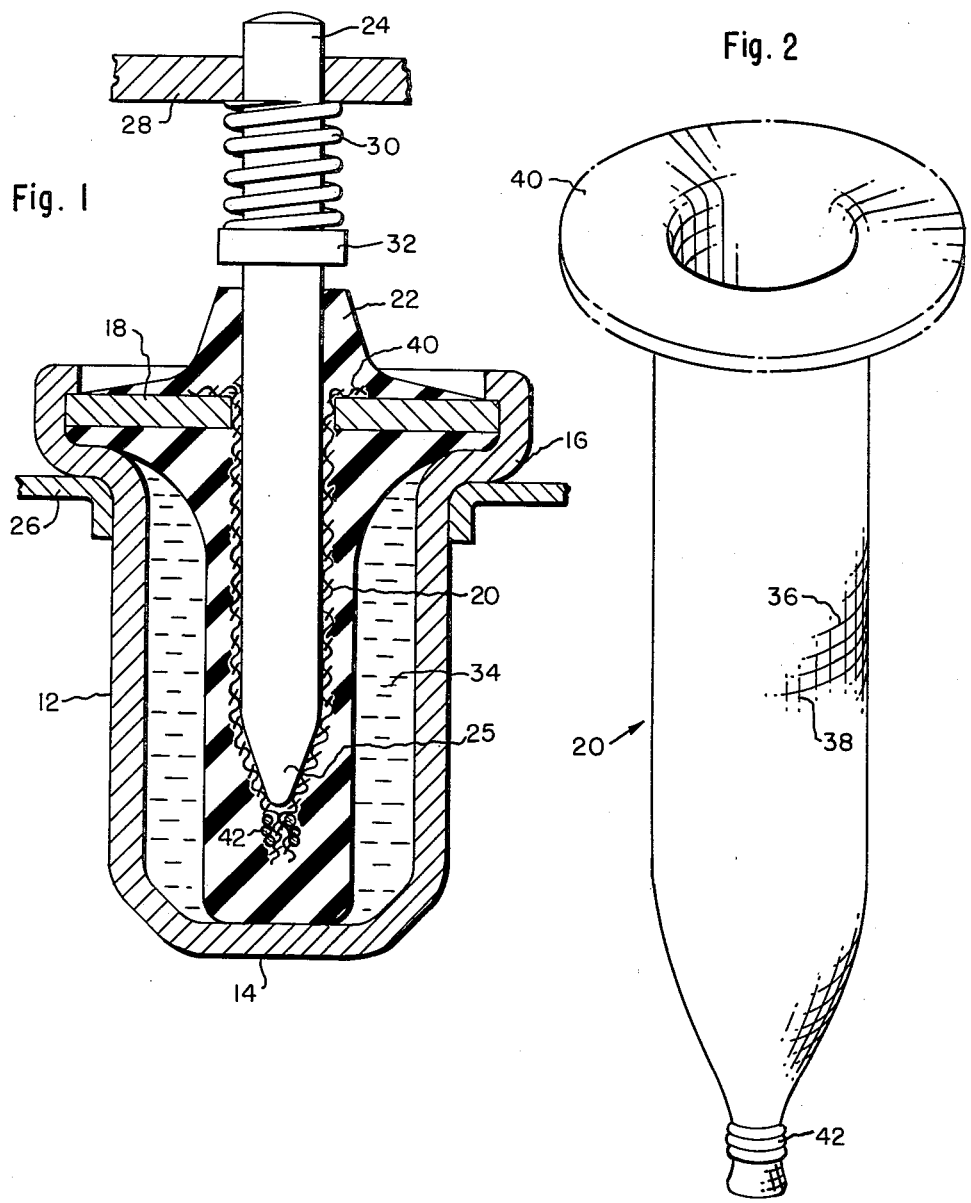

Aug. 1, 1961

J. E. WOODS 2,994,223

ACTUATING DEVICE

Filed Nov. 6, 1958

INVENTOR.
JOHN E. WOODS
BY KENWAY, JENNEY, WITTER & HILDRETH

ATTORNEYS

# United States Patent Office 2,994,223
Patented Aug. 1, 1961

2,994,223
ACTUATING DEVICE
John E. Woods, Cohasset, Mass., assignor to Standard-Thomson Corporation, Waltham, Mass., a corporation of Delaware
Filed Nov. 6, 1958, Ser. No. 772,196
6 Claims. (Cl. 73—368)

The present invention relates generally to thermal energy transducers, and more particularly to transducers of the type capable of transforming relatively large amounts of thermal energy to mechanical energy per stroke, while occupying only a small space.

In this class of actuators, there is provided a housing member in which is slidably received an actuator pin, the pin being resiliently engaged with a load tending to urge the pin into the housing. A thermal sensitive expansible-contractible material within the housing applies variable pressure dependent on temperature to the pin tending to force it axially from the housing. The pressure is applied to the pin through a body of deformable material such as rubber or a rubber substitute which surrounds the pin within the housing and acts as a seal for the thermal material.

In many applications it is desired to have a pin of relatively small diameter, for example one-eighth inch, which is to have a stroke in the operating range of as much as one-fourth inch or more. The present invention is particularly concerned with such applications in which the externally-applied load on the pin is of relatively high order, necessitating the development of large pressure forces within the housing to overcome the load. In these applications the frictional drag of the deformable body on the sliding pin becomes an important limiting factor. Unfortunately, rubber and most rubber substitutes have relatively high coefficients of friction with a steel pin. At elevated pressures, the friction developed against the pin not only limits the permissible external pin load but also ultimately results in scuffing or galling of the elastomer in the portions thereof adjacent the pin.

It is accordingly a principal object of this invention to provide improved means for slidably supporting the actuator pin to reduce the frictional drag thereon at elevated pressures.

Various attempts have been made to overcome the friction problem. One approach is to utilize a lubricant between the pin and the deformable body. Such lubricants include silicone greases and dispersions of nylon or Teflon, the latter being a tetrafluoroethylene polymer resin. This approach is limited by the ability of the lubricant to coat the entire surface of the pin in contact with the deformable body, and to remain in contact with the pin without being absorbed into the deformable body.

Another approach is to substitute a different material for frictional engagement with the deformable body. To this end the actuator pin may be coated with Teflon, for example. However, this approach is limited by the availability of a material suitable for coating the steel pin, and in general these materials do not have sufficiently low coefficients of friction to reduce the friction to a satisfactory extent.

An ideal combination of sliding surfaces would be provided by a bearing of Teflon or a like material and a polished metal actuator pin. However, the mode of operation of this form of actuator as described above is such that the pin is propelled by a "squeeze action" requiring lateral contraction of the deformable body and Teflon in a conventional form such as a sleeve does not have the requisite ability to permit this type of deformation. It is a second object of this invention to provide Teflon or the like bearing means of an improved form permitting advantage to be taken of the low friction properties thereof.

With the foregoing and other objects in view, the principal feature of the present invention resides in the provision of a woven fabric sleeve of fibers having a low coefficient of friction against the sliding actuator pin, this fabric providing the bearing for axial propulsion of the pin by "squeeze action" and separating it from contact with the deformable body.

Other features reside in certain details of construction and in arrangements and modes of operation which will become evident from the following description of a preferred form of actuator, having reference to the appended drawings, in which FIG. 1 is an axial elevation in section of the actuator; and FIG. 2 is a detail view showing the woven bearing sleeve on a somewhat enlarged scale.

Referring to the drawings, there is provided a rigid metal housing 12 of generally cylindrical shape with a closed end 14, the opposite end being radially expanded and having a shoulder 16. The housing is closed by a metallic end disk 18 about which it is crimped by a continuous turned-in edge at its open end. Before assembly with the housing, the disk 18 is placed in a mold with a mold pin received through a hole therein, the mold pin having a woven fabric sleeve 20 fitted over it as illustrated in FIG. 1. The woven sleeve is more fully described below with reference to FIG. 2. A body 22 of deformable material, which is preferably elastomeric in nature, for example rubber or a rubber substitute, is then formed and cured in the mold with a good mechanical bond to the sleeve 20, after which the mold pin is removed. A rigid pin 24 of polished stainless steel with a tapered end 25 is then received into the sleeve 20 which forms a bearing for it.

The housing is adapted to be supported by its shoulder 16 in a suitable plate or frame member 26. The pin 24 bears at its upper end on a mechanical load which may take any desired form. The illustrated example consists of a fixed plate 28 to receive the end of the pin and a compression spring 30 bearing at one end on the plate 28 and at the other end on a flange 32 secured rigidly to or integral with the pin 24.

The body 22 is surrounded by a body 34 of temperature sensitive expansible-contractible material. In fabrication of the actuator, a measured quantity of the material 34 is placed in the housing 12, after which the molded body 22 with the disk 18 and sleeve 20 is inserted in the housing and the end of the housing is crimped over the disk 18. Finally, the pin 24 is inserted in place and the device is calibrated by the method described in the patent to C. W. Wood 2,806,376. Alternatively, calibration may be done as described in my copending application Serial No. 767,556, filed October 16, 1958.

Referring to FIG. 2, the sleeve 20 is preferably fabricated of woven strands of Teflon or a fiber of like properties. Teflon is selected because it serves as an excellent low-friction bearing for metal parts. The tube is of simple cylindrical shape and is seamless. Any common method of weaving which provides a relatively uniform bearing surface with many points of contact between the woven strands and the metal pin is suitable. In the illustrated form, the sleeve 20 is woven by passing a single continuous closely-wound helical strand 36 alternately over and under a plurality of longitudinal strands 38 extending the length of the sleeve.

The sleeve 20 is severed to lengths somewhat longer than the distance by which the pin 24 extends into the housing 12 in its lowest position. The upper end of the sleeve is shaped and molded against the disk 18 in the form of a flange 40, and the lower end is tied by suitable strands 42 of strong fiber or wire. It will be understood that suitable provision will be made to insure a good mechanical bond at all points of contact between the fibers of the sleeve 20 and the deformable body 22.

In operation, the thermal sensitive material 34 expands upon an increase in temperature, causing the body 22 to constrict the sleeve 20 laterally against the pin 24. Thus the pin 24 is propelled by an axial thrust against the reaction of the compression spring 30. The sleeve 20 follows the contour of the tapered portion 25 of the pin 24 and transmits the longitudinal thrust to this portion. The pin slides readily within the sleeve 20 due to the low friction developed therewith.

As the material 34 cools it contracts, allowing the spring 30 to push the pin 24 further into the housing, and the pin 24 moves longitudinally within the sleeve 20. It will be understood that no part of the sleeve 20 moves longitudinally of the pin as the pin slides within it, but rather, the sleeve constricts laterally by a "squeeze effect" in the region adjacent the tapered end of the pin so as to remain in substantially continuous contact with it.

From the foregoing description, it will be appreciated that an actuator capable of developing considerable internal pressures has been provided. These internal pressures may be developed into mechanical energy with little loss from friction against the actuator pin. It will be further understood that while the invention has been described with reference to a preferred embodiment thereof, various modifications familiar to those skilled in this art may be incorporated therein without departing from the spirit or scope of the invention.

Having thus described the invention, I claim:

1. An actuator having, in combination, a housing defining a chamber and having an opening therein, a constrictable woven fabric sleeve of substantially the same diameter as the opening within the chamber and having an open end secured to the housing about the opening, a body of deformable material closely surrounding the sleeve within the chamber and closed about the opposite end of said sleeve, said body having an annular clearance from the wall of the chamber, a rigid member having a generally conical end portion and slidably extending into the sleeve through said opening, the sleeve being secured to the housing about the opening in position to separate said body of deformable material from said rigid member, being tapered at its opposite end to follow the contour of said rigid member and having a low coefficient of friction with said rigid member, and a quantity of pressure-transmitting material filling the balance of the chamber, whereby upon an increase in the pressure in said pressure-transmitting material, said deformable body and sleeve are laterally constricted about said conical end portion of said rigid member to propel it from the housing.

2. The combination according to claim 1, wherein the annular clearance body of deformable material from the wall of the chamber extends longitudinally of the rigid member over a substantial length of the latter and beyond the end thereof within the chamber.

3. The combination according to claim 1, wherein the body of deformable material is bonded to the housing about the opening therein to seal the chamber.

4. The combination according to claim 1, wherein the body of deformable material is molded to the sleeve.

5. An actuator having, in combination, a housing defining a generally cylindrical chamber and having an opening of substantially smaller diameter than the chamber in a position substantially coaxial therewith, a constrictable woven fabric sleeve of substantially the same diameter as the opening within the chamber and having an open end secured to the housing about the opening, a body of deformable material closely surrounding the sleeve within the chamber and closed about the opposite end of said sleeve, said body having annular clearance from the wall of the chamber, a rigid member having a generally conical end portion and slidably extending into the sleeve through said opening, the sleeve being secured to the housing about the opening in position to separate said body of deformable material from said rigid member, being tapered at its opposite end to follow the contour of said rigid member and having a low coefficient of friction with said rigid member, and a quantity of pressure-transmitting material filling the balance of the chamber, whereby upon an increase in the pressure in said pressure-transmitting material, said deformable body and sleeve are laterally constricted about said conical end portion of said rigid member to propel it from the housing.

6. The combination as in claim 5, wherein the sleeve is closed about the end of the rigid member.

References Cited in the file of this patent

UNITED STATES PATENTS

| | | |
|---|---|---|
| 2,208,149 | Vernet | July 16, 1940 |
| 2,368,181 | Vernet | Jan. 30, 1945 |
| 2,804,886 | White | Sept. 3, 1957 |
| 2,806,375 | Wood | Sept. 17, 1957 |
| 2,806,376 | Wood | Sept. 17, 1957 |
| 2,840,881 | Bateman | July 1, 1958 |
| 2,862,283 | Rasero | Dec. 2, 1958 |